(12) United States Patent
Helot et al.

(10) Patent No.: US 6,185,095 B1
(45) Date of Patent: Feb. 6, 2001

(54) COMPUTER DOCKING STATION WITH RETRACTABLE RELEASE LEVER

(75) Inventors: Jacques H. Helot, San Mateo, CA (US); Michael D. Derocher, Corvallis, OR (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/141,942

(22) Filed: Aug. 28, 1998

(51) Int. Cl.[7] .............................. H05K 5/00; H05K 7/00
(52) U.S. Cl. .................... 361/686; 312/223.1; 312/223.2
(58) Field of Search .................................. 361/686, 724, 361/725, 726; D14/107, 434; 395/281, 282, 283; 312/223.1, 223.2

(56) References Cited

U.S. PATENT DOCUMENTS

| | | | |
|---|---|---|---|
| 5,928,017 | * | 7/1999 | Lan .................................... 361/686 |
| 6,072,695 | * | 6/2000 | Steiger et al. ....................... 361/686 |

\* cited by examiner

*Primary Examiner*—Leo P. Picard
*Assistant Examiner*—Tung Minh Bui

(57) ABSTRACT

A computer docking station for a portable computer has an enclosure to mate physically and electrically with the portable computer. The enclosure has a docking tray upon which the portable computer rests when docked. One or more slideable engagement members are mounted to slide on the docking tray to engage the portable computer when the computer is being docked. The engagement members slide as the computer is moved to the docked position to securely hold the portable computer in the docking station. A link mechanism internal of the enclosure is connected to move the engagement members between the undocked and docked positions. A lever is provided to allow a user to actuate the link mechanism. The lever is movable between an exposed position in which the lever is accessible to the user for actuating the mechanism and an unexposed position in which the lever is inaccessible to the user. In the unexposed position, the lever is retracted into the enclosure. A lever release mechanism is provided to transition the lever from the unexposed position to the exposed position. Upon actuation, the docking station informs the portable computer of an impending undocking action to give the portable computer adequate time to prepare for undocking. The lever release mechanism delays movement of the lever until receiving a message from the portable computer indicating readiness for undocking. Once the portable computer is ready, the lever release mechanism moves the lever to the exposed position for accessibility by the user.

21 Claims, 4 Drawing Sheets

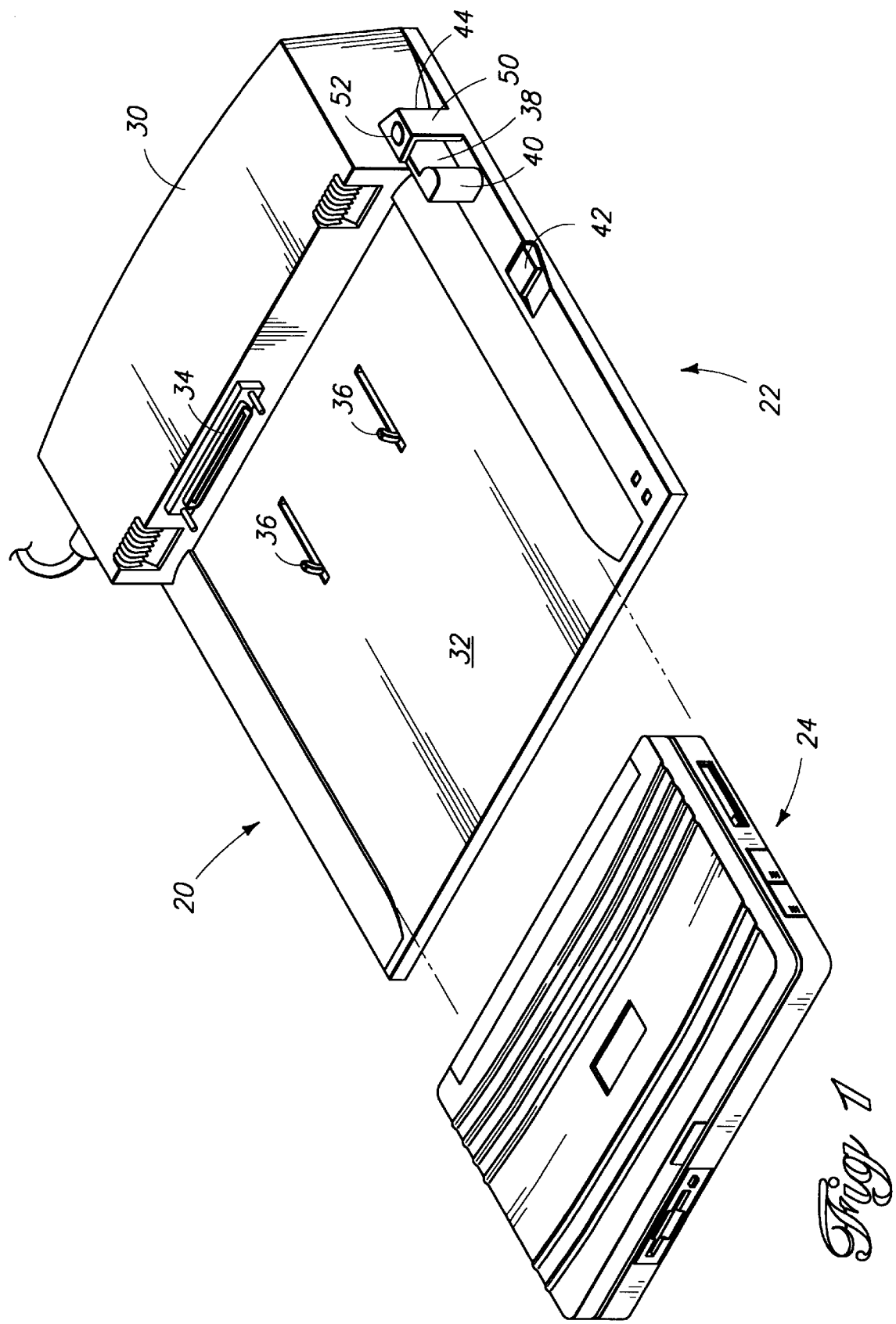

COMPUTER DOCKING STATION WITH RETRACTABLE RELEASE LEVER

TECHNICAL FIELD

This invention relates to computer docking stations.

BACKGROUND

Portable computers are widely used and are increasingly popular as an alternative to desktop computers. This ability to carry a powerful computing device that offers a full range of processing and communication functionality is very appealing to our mobile generation.

Despite these advantages, the portable computer fails to match the desktop computer in the area of user comfort and ergonomics. By necessity, portable computers are small, thin, lightweight machines that users can slide easily into their briefcases. As a result, the keyboards and displays are smaller and less ergonomically comfortable to use. While sensible for travel and portability, the portable computer is not as conducive for office use.

The minor inconveniences of portable computers have been somewhat alleviated with the advent of docking stations. A docking station is a stationary unit that adapts a portable computer for use as a stationary desktop computer. Conventional docking stations physically interconnect with the portable computer and provide electronics and processing components to interface the portable computer with a large CRT monitor (e.g., VGA), a normal size or ergonomic keyboard, a mouse, and other peripherals (e.g., printer, CD-ROM drive, etc.). The docking station resides permanently on the user's desk.

When working at the desk, the user docks the portable computer at the docking station by physically loading the computer into the docking station. Once physically mated, the portable computer is electronically interfaced via the docking station to control the peripherals, such as the monitor, keyboard, CD-ROM drive, printer, and so forth. In this manner, the portable computer operates as the central processing unit (CPU), with the docking station providing support capabilities for the peripherals. When the user leaves the desk, he/she simply undocks the portable computer from the docking station and carries it along for portable use.

Docking stations range in their sophistication and available extensions to the portable computer. A scaled-down docking station, which is commonly referred to as a "port replicator", merely extends a set of peripheral ports for the docked portable computer. Power might also be directed through a port replicator so that the portable computer need not be manually plugged in before desktop use.

A slightly more sophisticated docking station, which is often referred to as an "enhanced port replicator", offers a similar set of peripherals and additional features, such as an external bus system. An external bus system allows use of expansion cards in conjunction with the portable computer.

More sophisticated stations, often called "full" docking stations or simply "docking stations", offer integrated computer peripherals in addition to peripheral ports and bus systems. For instance, a docking station might include sound peripherals such as speakers, hard disk drives, CD ROM drives, DVD drives, and tape backup systems.

While portability and compact size are appealing qualities in portable computers and docking stations, these very same attributes pose a significant risk of theft. Portable computers and docking stations are easy to steal. While walking off with a desktop PC might garner some questioning looks in the workplace, carrying around a portable computer or docking station may go unnoticed due to the inherent attributes of these devices.

Desktop locks are available to address this problem. One type of lock is a device consisting of a cable or tether that can be secured at one end to a desk or fixture, and at the other end to a computer. Many portable computers and docking stations are equipped with receptacles for mating with such locks.

In some cases, however, only the docking station is physically secured to a desk or fixture. The portable computer is simply interfaced to the docking station without being physically secured. While the docking station may have a mechanism to hold the computer in place, these mechanisms are often not designed to prohibit theft of the computer from the docking station. Even for those that are intended to deter theft, a person may be able to physically overpower the mechanism to steal the computer.

Another problem concerns prematurely undocking the computer before the software has terminated its connection with the docking station. A user may attempt to disengage the portable computer by physically removing it from the docking station before the software is ready. This forceful withdrawal may cause an error in the program if the computer software is not given sufficient time to terminate its session with the docking station.

Accordingly, there is room for improving the way portable computers are docked and undocked to enhance security and performance.

SUMMARY

A computer docking station for a portable computer has an enclosure to mate physically and electrically with the portable computer. The enclosure has a docking tray upon which the portable computer rests when docked. One or more slideable engagement members are slidably mounted in the docking tray to engage the portable computer when the computer is being docked. The engagement members slide as the computer is moved to the docked position to securely hold the portable computer in the docking station.

A linking mechanism internal of the enclosure is connected to move the engagement members between the undocked and docked positions. A lever is provided to allow a user to actuate the mechanism. The lever is movable between an exposed position in which the lever is accessible to the user for actuating the mechanism and an unexposed position in which the lever is inaccessible to the user. In the unexposed position, the lever is retracted into the enclosure. A solenoid or other mechanism is used to lock the lever, the linking mechanism, and engagement members in the docked position to deter theft of the computer while docked.

A lever release mechanism is provided to transition the lever from the unexposed position to the exposed position when the user is ready to undock the computer. The lever release mechanism has an ejection or "undock" button exposed on the external surface of the enclosure. Upon pressing the button, the docking station informs the portable computer of an upcoming undocking action to give the portable computer adequate time to prepare for undocking. During the interim, the software performs procedures to terminate the docking session. The lever release mechanism delays movement of the lever until receiving a message from the portable computer indicating its readiness for undocking. Once the portable computer is ready, the lever release mechanism moves the lever to the exposed position for accessibility by the user.

The lever has a tab to provide a first grip location for the user to use when manually undocking the computer. The user slides the lever to cause the engagement members, via the mechanism, to slide toward their undocked position and thereby decouple the portable computer from the docking station. The docking station has a retractable tab spaced from the lever to provide a second grip location for the user to apply a counter force when moving the lever. The retractable tab is movable between a flush position where it is flush with the docking tray and a projected position where it projects upwardly from the docking tray.

BRIEF DESCRIPTION OF THE DRAWINGS

FIG. 1 is a perspective view of a portable computer and docking station.

DETAILED DESCRIPTION

Figure 2B:
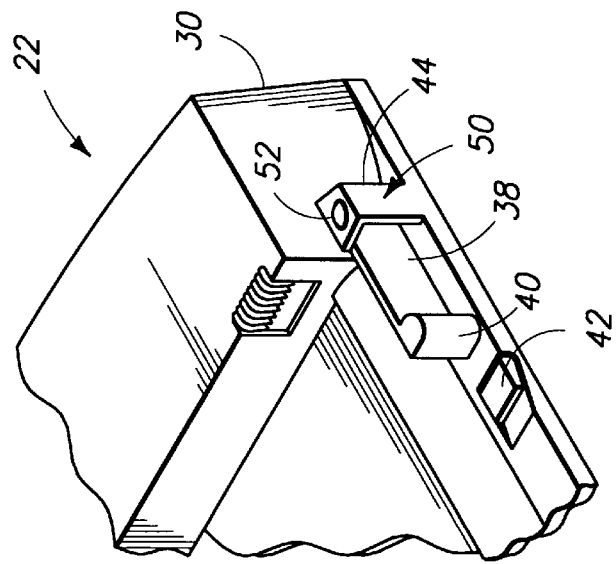
FIGS. 2a and 2b are partial perspective views of a rear corner of the docking station, showing a docking release lever in different positions.

FIG. 1 shows a computer system 20 having a docking station 22 and a portable computer 24. The portable computer 24 is illustrated as a laptop computer and the docking station 22 is sized and shaped with a docking tray to receive the laptop computer. The portable computer 24 can be loaded or "docked" at the docking station 22 in which the computer is physically and electrically mated with the docking station, or removed or "undocked" from the docking station in which the computer is decoupled from the docking station.

The docking station and portable computer can be implemented as other types of computing devices. For instance, the docking station may be implemented as a "port replicator" for a notebook computer or sub-notebook computer. The docking station might further be implemented as a "cradle" for a palmtop computer. As used herein, the term "docking station" is intended to broadly apply to forms of bases ranging from a sophisticated docking station having internal processing and electronic components, cable interconnects, and a power supply unit, to an unsophisticated port replicator that simply provides a means to manage cable connections.

The docking station 22 comprises an enclosure 30 formed of hard plastic or metal. The enclosure defines a docking tray 32 to support the portable computer 24 when docked. An interface port 34 is exposed adjacent the tray 32 to receive a compatible port in the back of computer 24 to facilitate electronic coupling of the computer to the docking station.

The docking station 22 has a pair of engagement members 36 that grasp corresponding apertures or slots in the underside of the computer 24. The engagement members 36 are illustrated as hooks that slide between first or undocked positions and second or docked positions.

A lever 38 is mechanically coupled via a mechanical link inside the enclosure (not shown) to move the engagement members 36 between the undocked and docked positions. The lever 38 extends along side the docking tray 32 and moves in a direction approximately parallel with the direction that the portable computer moves when being docked or undocked. The lever 38 is further movable between an exposed position, in which the lever is accessible to a user to move the engagement members between their undocked and docked positions, and an unexposed position, in which the lever is inaccessible to the user.

While in the unexposed position, the user can move the lever 38 forwards to cause the engagement members 36 to shift toward the front of the docking tray and away from the interface port 34. Moving the lever 38 forward undocks the computer from the docking station. The lever 38 has a tab 40 to provide a first grip location for the user. The tab 40 is sized to accommodate an index finger or a couple fingers.

The docking tray 22 has a second tab 42 spaced from the lever 38 to provide a second grip location for the user to apply a counter force when moving the lever 38. The tab may be formed into the enclosure 30, or more preferably, may be configured as a retractable tab that is movable between a flush position and a projected position. In the flush position, the counter tab is flush with the docking tray 32 whereas in the projected position, the counter tab projects upwardly from the docking tray. The retractable tab is described below in more detail with reference to FIGS. 3a and 3b.

When the engagement members 36 are in their undocked position (as shown in FIG. 1), the portable computer 24 can be conveniently set on the tray 32 and mated with the engagement members 36. Once the computer is mounted, the user pushes the lever 38 back, causing the engagement members 36 to slide toward the rear of the docking tray 32 and toward the interface port 34. The user applies force with his/her thumb to the lever's tab 40 and a counter force with his/her index finger to a third tab 44 formed in the enclosure 30. When the engagement members 36 reach their docked positions, the computer is electronically connected to the interface port 34 and securely held on the docking tray via the engagement members 36.

In the docked position, the lever 38 can be moved to its unexposed position where it is inaccessible to the user. In this position, the user cannot grasp the lever 38 and attempt to force the mechanism to an undocked position. Additionally, the docking station has a means for securely locking the lever and engagement members in the docked position. This feature guards against theft and premature undocking before the software is ready.

Figure 2A:
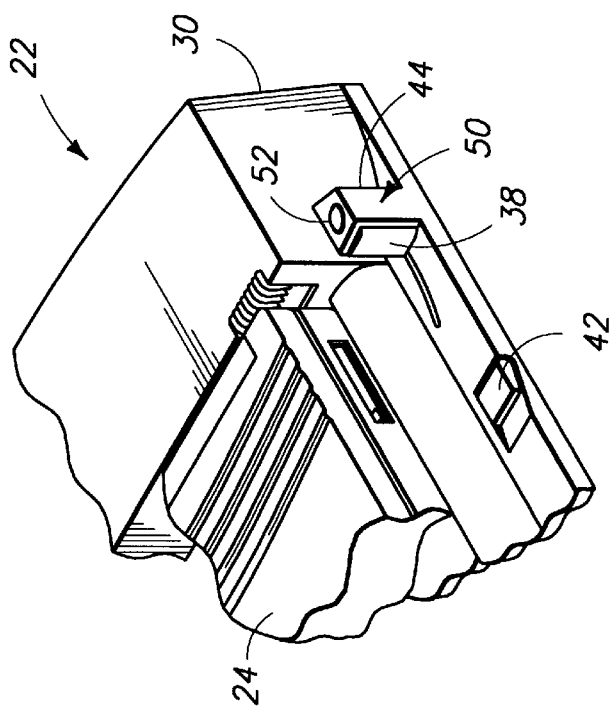

FIGS. 2a and 2b shows a partial view of the back corner of the docking station 22 with the computer 24 docked thereon. The figures show the lever 38 at two positions during operation that are different than the neutral or rest (i.e., exposed) position in FIG. 1. In FIG. 2a, the lever 38 is retracted into the enclosure 30 in the unexposed position. A person cannot grasp the tab 40 while the lever 38 is in the unexposed position.

The docking station has a lever release mechanism 50 that releases the lever from the unexposed position (FIG. 2) to the exposed position (FIG. 1). The lever release mechanism 50 includes an undock button 52 exposed on the enclosure 30 for access by the user. The user can press the button 52 to activate the lever release mechanism 50 to release the lever 38.

Upon actuation of the lever release mechanism 50, the docking station informs the portable computer of an upcoming and impending undocking action. This warning gives the portable computer, and particularly the software operating on the portable computer, adequate time to prepare for undocking. The lever release mechanism 50 delays movement of the lever 38 until receiving a message from the portable computer indicating a readiness for undocking or until a specified time period has elapsed. Once the portable computer is ready, the lever release mechanism 50 moves the lever 38 to the exposed position for accessibility by the user, as shown in FIG. 1.

When the lever is in the exposed position, the user can grasp the lever and move it forward to undock the computer. The user applies a squeezing pressure to the lever tab 40 and the counter tab 42 to move the lever to an extended position. FIG. 2b shows the lever in the extended position. The release mechanism has a spring or other means to return automatically the lever to the exposed position (FIG. 1) after being released by the user.

When the computer is once again positioned on the docking tray, the user moves the lever 38 backward toward the protection hood to dock the computer. The user applies a squeezing pressure to the lever tab 40 and the back tab 44 to move the lever 38 to the unexposed position, as shown in FIG. 2a.

Figure 3B:
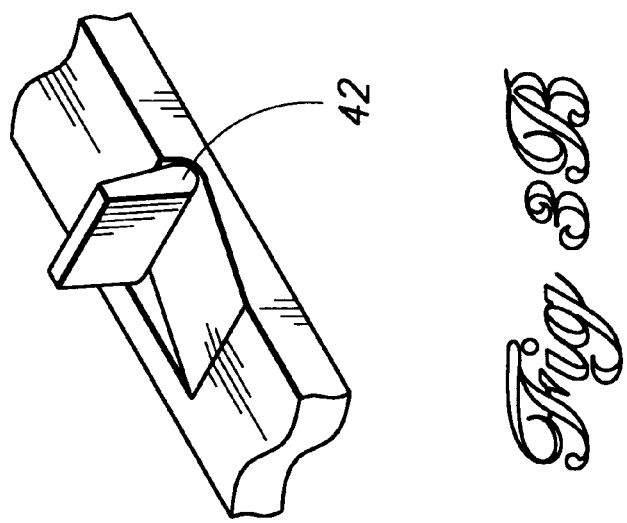
FIGS. 3a and 3b are partial perspective views of a side of the docking station, which shows a retractable gripping tab that moves between a flush position (FIG. 3a) and a projected position (FIG. 3b).
Figure 3A:
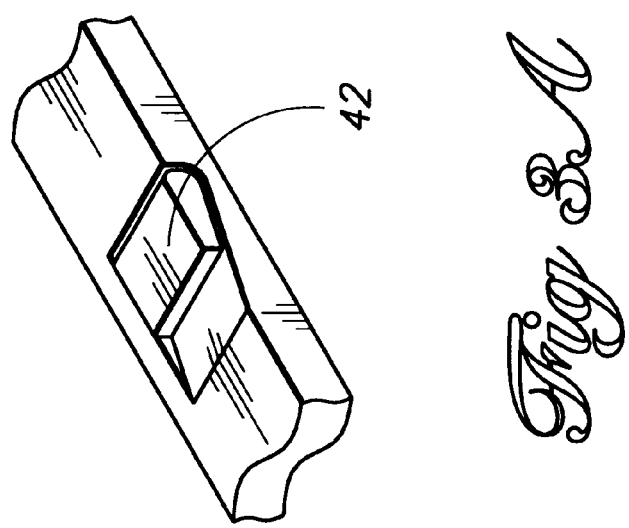

FIGS. 3a and 3b show the counter tab 42 according to one exemplary implementation. In FIG. 3a, the counter tab 42 is in its retracted, flush position where it is flush with the docking tray. In this position, the tab allows easy access to components and ports on the side of the computer, such as PC card slots, batteries, modem jack, mouse port, and so on. Additionally, the flush tab maintains the minimum profile height of the docking tray. In FIG. 3b, the counter tab 42 is raised to its projected position to define a grip location for the user's thumb. The raised tab provides sufficient area to comfortably accommodate a user's thumb without slipping. A spring-like mechanism forces the counter tab 42 to the retracted position.

Figure 4A:
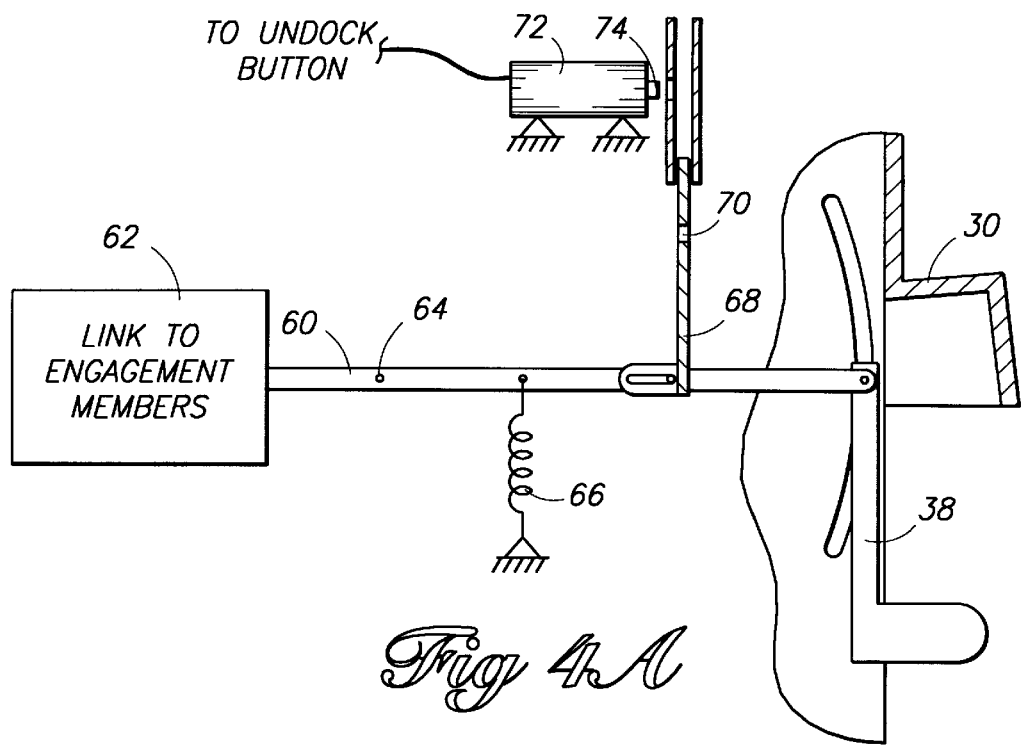
FIGS. 4a and 4b is a diagrammatic illustration of a docking release system internal of the docking station according to an exemplary implementation.
Figure 4B:
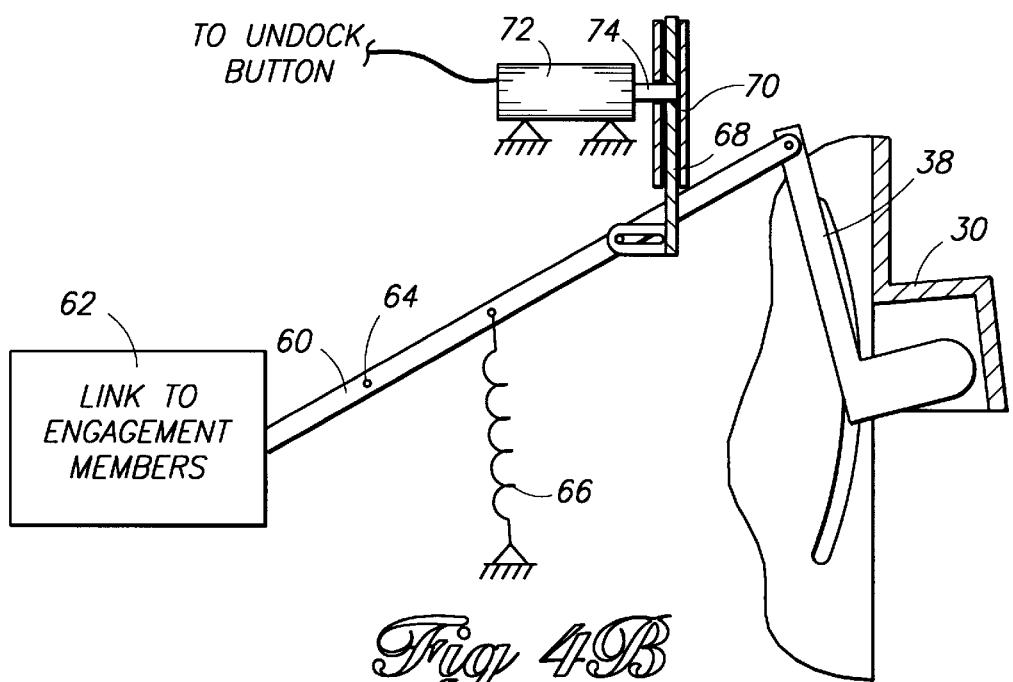

FIGS. 4a and 4b show one exemplary implementation of mechanical components employed in the docking release system. In FIG. 4a, the lever 38 is in its exposed position. A mechanical member or beam 60 has one end pivotally coupled to the lever 38 and a second end connected to a mechanical link assembly 62. The beam 60 is pivotally mounted within the enclosure 30 at a pivot point 64. A spring 66 biases the beam 60 toward the position shown in FIG. 4a so that the lever 38 is exposed.

The mechanical link assembly 62 is constructed to move the engagement members 36. The assembly can be essentially any type of mechanical or electromechanical device that moves the engagement members 36 back and forth in response to movement of the beam 60 (and lever 38).

A crossbeam 68 has one end pivotally connected to the beam 60 and an opposing free end. An aperture 70 is formed in the free end of the crossbeam 68. Movement of the beam 60 causes the crossbeam 68 to move up and down relative to the orientation shown in the figure.

A solenoid 72 is spaced from the mechanical assembly and is used to lock the assembly in place while the computer is in the docked position. The solenoid 72 is electrically driven to move a shaft 74. The solenoid 72 is also electrically coupled to respond to activation of the undock button 52 (FIGS. 1 and 2). Although a solenoid is shown, other mechanical or electromechanical means for locking the assembly may be used.

When the lever 38 is moved to its unexposed position (FIG. 4b), the beam 60 is pivoted counterclockwise about the pivot point 64 and against the bias of the spring 66. The crossbeam 68 is moved beside the solenoid 72 so that the aperture 70 aligns with the solenoid shaft 74. The solenoid 72 moves the shaft 74 through the aperture 70 to lock the assembly in place. This in turn locks the engagement members 36 in their docked position, thereby securely holding the portable computer 24 on the docking tray 32 and in electrical connection with the interface port. Additionally, the lever 38 is locked in its hidden position within the enclosure 30.

When the user presses the undock button 52, the docking station informs the computer that the user has initiated an undocking procedure. The docking station waits until the computer returns a message indicating that the software has terminated its session. Alternatively, the solenoid is designed to delay for a preset period of time before retracting the shaft.

When the message is received or the time has elapsed, the solenoid 72 retracts the shaft 74 from the aperture 70 to release the crossbeam 68. The spring 66 contracts, causing the beam 60 to pivot clockwise about the pivot point 64. This rotation moves the lever 38 to the exposed position, as shown in FIG. 4a.

From there, the user can manipulate the lever to eject the computer from the docking station. The user moves the lever 38 forward to its extended position (FIG. 2b), which causes the spring 66 to compress. When the user releases the lever from its extended position, the spring 66 forces the lever 38 back to the neutral exposed position of FIG. 4a. It is noted that a second spring-like mechanism may be added to provide the return force, rather than relying on spring 66 for that force.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A docking station for a portable computer, comprising:
   an enclosure configured to dock the portable computer;
   a mechanism to engage and hold the portable computer in a docked position relative to the enclosure and to release the portable computer in an undocked position; and
   a lever for actuating the mechanism to control docking and undocking of the portable computer, the lever being movable between an exposed position in which the lever is accessible to a user for actuating the mechanism and an unexposed position in which the lever is inaccessible to the user.

2. A docking station as recited in claim 1, wherein the lever is retracted into the enclosure in the unexposed position.

3. A docking station as recited in claim 1, wherein the enclosure has a docking tray to support the portable computer and the lever extends along side the docking tray in the exposed position and is retracted into the enclosure in the unexposed position.

4. A docking station as recited in claim 1, wherein the lever slides between the exposed and unexposed positions in a direction approximately parallel with a direction in which the portable computer moves between the docked and undocked positions.

5. A docking station as recited in claim 1, further comprising means for locking the lever in the unexposed position.

6. A docking station as recited in claim 1, further comprising a lever release mechanism to move the lever from the unexposed position to the exposed position.

7. A docking station as recited in claim 6, wherein upon actuation of the lever release mechanism, the portable computer is informed of an impending undocking to give the portable computer adequate time to prepare for undocking, the lever release mechanism delaying movement of the lever until receiving a message from the portable computer indicating readiness for undocking.

8. A docking station for a portable computer, comprising:
an enclosure configured to dock the portable computer;
a mechanism to engage and hold the portable computer in a docked position relative to the enclosure and to release the portable computer in an undocked position;
a lever for actuating the mechanism to control docking and undocking of the portable computers the lever being movable between an exposed position in which the lever is accessible to a user for actuating the mechanism and an unexposed position in which the lever is inaccessible to the user; and
a lever release mechanism to move the lever from the unexposed position to the exposed position, wherein the lever release mechanism includes an undock button, which upon activation causes the lever release mechanism to move the lever from the unexposed position to the exposed position.

9. A docking station for a portable computer, comprising:
an enclosure configured to dock the portable computer;
a mechanism to engage and bold the portable computer in a docked position relative to the enclosure and to release the portable computer in an undocked position;
a lever for actuating the mechanism to control docking and undocking of the portable computer, the lever being movable between an exposed position in which the lever is accessible to a user for actuating the mechanism and an unexposed position in which the lever is inaccessible to the user, wherein the lever has a tab to provide a grip location for the user; and
a counter tab spaced from the lever to provide a second grip location for the user to apply a counter force when moving the lever.

10. A docking station as recited in claim 9, wherein the counter tab is movable between a retracted position and a non-retracted position.

11. A docking station as recited in claim 9, wherein the enclosure has a docking tray to support the portable computer and the counter tab rotates between a flush position in which the counter tab is flush with the docking tray and a projected position in which the counter tab projects upwardly from the docking tray.

12. A docking station for a portable computer, comprising:
an enclosure having a docking tray to dock a portable computer;
at least one slideable engagement member slidably mounted in the tray of the enclosure to engage the portable computer in an undocked position and to slide and hold the portable computer in a docked position;
a mechanism connected to move the engagement member between the undocked and docked positions;
a lever for actuating the mechanism, the lever being movable between an exposed position in which the lever is accessible to a user for actuating the mechanism and an unexposed position in which the lever is inaccessible to the user;
a lever release mechanism to move the lever from the unexposed position to the exposed position; and
whereupon actuation of the lever release mechanism, the portable computer is informed of an impending undocking to give the portable computer adequate time to prepare for undocking, the lever release mechanism delaying movement of the lever.

13. A docking station as recited in claim 12, wherein the lever is retracted into the enclosure in the unexposed position.

14. A docking station as recited in claim 12, wherein the lever extends along side the docking tray in the exposed position and is retracted into the enclosure in the unexposed position.

15. A docking station as recited in claim 12, further comprising means for locking the lever in the unexposed position.

16. A docking station for a portable computer, comprising:
an enclosure having a docking tray to dock a portable computer;
at least one slideable engagement member slidably mounted in the tray of the enclosure to engage the portable computer in an undocked position and to slide and hold the portable computer in a docked position;
a mechanism connected to move the engagement member between the undocked and docked positions;
a lever for actuating the mechanism, the lever being movable between an exposed position in which the lever is accessible to a user for actuating the mechanism and an unexposed position in which the lever is inaccessible to the user, wherein the lever has a tab to provide a grip location for the user;
a counter tab spaced from the lever to provide a second grip location for the user to apply a counter force when moving the lever;
a lever release mechanism to move the lever from the unexposed position to the exposed position;
whereupon actuation of the lever release mechanism, the portable computer is informed of an impending undocking to give the portable computer adequate time to prepare for undocking, the lever release mechanism delaying movement of the lever.

17. A docking station as recited in claim 16, wherein the counter tab is movable between a retracted position and a non-retracted position.

18. A docking station as recited in claim 16, wherein the counter tab rotates between a flush position in which the counter tab is flush with the docking tray and a projected position in which the counter tab projects upwardly from the docking tray.

19. A docking station for a portable computer, comprising:
an enclosure having a docking tray to dock a portable computer;
a release lever to release the portable computer from the enclosure; and
a retractable tab spaced from the lever to provide a grip location for the user to apply a force when moving the lever, the retractable tab being movable between a flush position in which the counter tab is flush with the docking tray and a projected position in which the counter tab projects upwardly from the docking tray.

20. A docking mechanism for computer docking station, comprising:
at least one engagement member to engage a portable computer;
a mechanical assembly connected to move the engagement member from an undocked position in which the portable computer is undocked from the docking station to a docked position in which the portable computer is docked at the docking station;

a lever connected to actuate the mechanical assembly, the lever being movable between an exposed position in which the lever is accessible to a user and an unexposed position in which the lever is inaccessible to the user.

21. A docking station comprising the docking mechanism as recited in claim 20.

* * * * *

UNITED STATES PATENT AND TRADEMARK OFFICE
CERTIFICATE OF CORRECTION

PATENT NO. : 6,185,095 B1
DATED : February 6, 2001
INVENTOR(S) : Jacques H. Helot et al.

It is certified that error appears in the above-identified patent and that said Letters Patent is hereby corrected as shown below:

Column 7,
Line 14, delete "computers" and insert therefor -- computer, --
Line 27, delete "bold" and insert therefor -- hold --

Signed and Sealed this

Fourteenth Day of September, 2004

JON W. DUDAS
*Director of the United States Patent and Trademark Office*